(12) United States Patent
Lehtiniemi

(10) Patent No.: US 10,425,468 B2
(45) Date of Patent: Sep. 24, 2019

(54) USER INTERFACE TRANSFER

(71) Applicant: Nokia Technologies Oy, Espoo (FI)

(72) Inventor: Arto Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/780,932

(22) Filed: Feb. 28, 2013

(65) Prior Publication Data

US 2014/0245172 A1 Aug. 28, 2014

(51) Int. Cl.
*H04L 29/08* (2006.01)
*G06F 9/451* (2018.01)
*G06F 3/14* (2006.01)

(52) U.S. Cl.
CPC .......... *H04L 67/10* (2013.01); *G06F 3/1454* (2013.01); *G06F 9/452* (2018.02)

(58) Field of Classification Search
CPC ...................................................... H04L 67/10
See application file for complete search history.

(56) References Cited

U.S. PATENT DOCUMENTS

| | | | |
|---|---|---|---|
| 6,343,313 B1* | 1/2002 | Salesky et al. | 709/204 |
| 6,968,153 B1* | 11/2005 | Heinonen | H04W 88/04 370/338 |
| 8,260,883 B2 | 9/2012 | Mooring et al. | |
| 8,346,867 B2* | 1/2013 | Sharkey | H04W 4/023 709/204 |
| 9,026,033 B2* | 5/2015 | Khedouri | G06F 17/30094 455/3.01 |
| 2002/0102998 A1* | 8/2002 | Lin | H04M 1/7253 455/466 |
| 2003/0050058 A1* | 3/2003 | Walsh | G06F 17/30053 455/426.1 |
| 2003/0229900 A1* | 12/2003 | Reisman | G06F 17/30873 725/87 |
| 2004/0110466 A1* | 6/2004 | Perlman | 455/12.1 |
| 2004/0111755 A1* | 6/2004 | Perlman | 725/133 |
| 2004/0160928 A1* | 8/2004 | Perlman | 370/338 |
| 2004/0221010 A1* | 11/2004 | Butler | G06F 3/038 709/204 |
| 2005/0063351 A1* | 3/2005 | Karaoguz | H04L 63/0492 370/338 |
| 2005/0086699 A1* | 4/2005 | Hahn et al. | 725/106 |
| 2005/0251566 A1* | 11/2005 | Weel | G06Q 30/06 709/219 |
| 2006/0008256 A1* | 1/2006 | Khedouri | G06F 17/30038 386/234 |

(Continued)

OTHER PUBLICATIONS

WebEx Meeting Center 7 Getting Started with WebEx Meeting Center last updated Jan. 16, 2006 47 pages.*

(Continued)

*Primary Examiner* — Kieu D Vu
*Assistant Examiner* — Alvaro R Calderon, IV
(74) *Attorney, Agent, or Firm* — Alston & Bird LLP

(57) ABSTRACT

Apparatuses, methods and computer programs are provided. A first apparatus is configured to: display a user interface, transfer the user interface to a second apparatus, and display the current location of the user interface. The second apparatus is configured to: receive the user interface from the first apparatus, display the user interface, and transfer the user interface to a third apparatus.

19 Claims, 12 Drawing Sheets

(56) References Cited

U.S. PATENT DOCUMENTS

| | | | |
|---|---|---|---|
| 2006/0146765 A1* | 7/2006 | Van De Sluis | G06F 3/016 370/338 |
| 2006/0150120 A1* | 7/2006 | Dresti | G06F 3/0481 715/810 |
| 2006/0239131 A1* | 10/2006 | Nathan | G11B 19/025 369/30.06 |
| 2006/0256074 A1* | 11/2006 | Krum | G06F 1/1626 345/156 |
| 2007/0049256 A1* | 3/2007 | Wassingbo | H04M 1/72519 455/414.1 |
| 2007/0146347 A1* | 6/2007 | Rosenberg | G06F 3/04883 345/173 |
| 2007/0214182 A1* | 9/2007 | Rosenberg | G06F 17/30749 |
| 2007/0220100 A1* | 9/2007 | Rosenberg | G06F 17/30053 709/206 |
| 2008/0010501 A1* | 1/2008 | Bucher et al. | 714/6 |
| 2008/0168368 A1* | 7/2008 | Louch et al. | 715/764 |
| 2008/0229215 A1* | 9/2008 | Baron | G06N 3/006 715/751 |
| 2008/0256129 A1* | 10/2008 | Salinas | H04N 21/4143 |
| 2009/0024931 A1* | 1/2009 | Bae | 715/748 |
| 2009/0070339 A1* | 3/2009 | Cho | G11B 27/329 |
| 2009/0144435 A1* | 6/2009 | Naniyat | 709/228 |
| 2009/0244015 A1* | 10/2009 | Sengupta | G06F 3/04883 345/173 |
| 2009/0319672 A1* | 12/2009 | Reisman | 709/227 |
| 2010/0082136 A1* | 4/2010 | Rosenblatt et al. | 700/94 |
| 2010/0094834 A1* | 4/2010 | Svendsen | G06F 17/30053 707/705 |
| 2010/0138509 A1* | 6/2010 | Castaldi et al. | 709/206 |
| 2010/0162178 A1* | 6/2010 | Tuli | 715/863 |
| 2010/0228740 A1* | 9/2010 | Cannistraro | G06F 17/30749 707/748 |
| 2010/0232343 A1* | 9/2010 | Xu et al. | 370/315 |
| 2010/0235762 A1* | 9/2010 | Laiho | G06F 17/30893 715/753 |
| 2010/0274858 A1* | 10/2010 | Lindberg | G06F 3/0481 709/206 |
| 2010/0287513 A1* | 11/2010 | Singh et al. | 715/863 |
| 2010/0315346 A1* | 12/2010 | Lindroos et al. | 345/173 |
| 2011/0072383 A1* | 3/2011 | Olausson | G06F 3/04817 715/772 |
| 2011/0074794 A1* | 3/2011 | Felt | H04N 21/4122 345/520 |
| 2011/0078573 A1* | 3/2011 | Ooba | G06F 9/4443 715/733 |
| 2011/0083111 A1* | 4/2011 | Forutanpour | G06F 1/1694 715/863 |
| 2011/0181496 A1* | 7/2011 | Lanier | G06Q 20/102 345/2.2 |
| 2011/0252317 A1* | 10/2011 | Keranen | G06F 3/04883 715/702 |
| 2011/0260985 A1* | 10/2011 | Colley | G06F 3/016 345/173 |
| 2011/0273368 A1* | 11/2011 | Hinckley | G06F 3/038 345/156 |
| 2012/0054637 A1* | 3/2012 | Arrasvuori et al. | 715/748 |
| 2012/0057082 A1* | 3/2012 | Dunn | G06F 3/04897 348/739 |
| 2012/0060100 A1* | 3/2012 | Sherwood | H04N 21/4122 715/748 |
| 2012/0083209 A1* | 4/2012 | Giles et al. | 455/41.2 |
| 2012/0117193 A1* | 5/2012 | Phillips | H04W 4/00 709/219 |
| 2012/0130834 A1* | 5/2012 | Landry | G06Q 30/0601 705/26.1 |
| 2012/0131465 A1* | 5/2012 | Telek | H04N 1/00347 715/733 |
| 2012/0158531 A1* | 6/2012 | Dion | G06Q 10/10 705/26.1 |
| 2012/0185770 A1* | 7/2012 | Hwang | G06F 17/30053 715/716 |
| 2012/0188147 A1* | 7/2012 | Hosein | H04M 1/72519 345/2.2 |
| 2012/0191832 A1* | 7/2012 | Kim | H04L 12/2812 709/223 |
| 2012/0221951 A1* | 8/2012 | Kidron | G06F 17/30867 715/716 |
| 2012/0226997 A1* | 9/2012 | Pang | H04L 65/4038 715/753 |
| 2012/0262380 A1* | 10/2012 | Sarjanoja | 345/173 |
| 2012/0272147 A1* | 10/2012 | Strober | 715/716 |
| 2012/0290648 A1* | 11/2012 | Sharkey | G06F 17/30053 709/204 |
| 2012/0306782 A1* | 12/2012 | Seo et al. | 345/173 |
| 2013/0018960 A1* | 1/2013 | Knysz | H04L 65/403 709/204 |
| 2013/0050080 A1* | 2/2013 | Dahl | G01S 5/18 345/158 |
| 2013/0080955 A1* | 3/2013 | Reimann | G06F 3/0486 715/769 |
| 2013/0095747 A1* | 4/2013 | Moshfeghi | 455/7 |
| 2013/0147832 A1* | 6/2013 | Patel | 345/619 |
| 2013/0154915 A1* | 6/2013 | Laibowitz et al. | 345/156 |
| 2013/0162683 A1* | 6/2013 | Paretti | G06T 3/60 345/650 |
| 2013/0179796 A1* | 7/2013 | BianRosa | G06F 3/0488 715/740 |
| 2013/0222273 A1* | 8/2013 | Tan | 345/173 |
| 2013/0225078 A1* | 8/2013 | Johansson | H04W 76/02 455/41.2 |
| 2014/0032635 A1* | 1/2014 | Pimmel et al. | 709/203 |
| 2014/0033058 A1* | 1/2014 | Perotti | G08C 17/00 715/740 |
| 2014/0237064 A1* | 8/2014 | Lin | H04L 41/046 709/208 |

OTHER PUBLICATIONS

International Search Report and Written Opinion for Application No. PCT/IB2014/058941 dated Jul. 22, 2014.
Invitation to Pay Additional Fees and, Where Applicable, Protest Fee and Partial International Search Report from International Application No. PCT/IB2014/058941 dated May 14, 2014.
U.S. Appl. No. 13/370,992, filed Feb. 10, 2012.
Office Action for European Patent Application No. 14706959.5 dated Feb. 21, 2017, 4 pages.
Office Action for Chinese Application No. 201480020788.0 dated May 4, 2018.
Office Action for Chinese Application No. 201480020788.0 dated Nov. 5, 2018, 6 pages.

* cited by examiner

USER INTERFACE TRANSFER

TECHNOLOGICAL FIELD

Embodiments of the present invention relate to user interface transfer. In particular, they relate to sharing a user interface between multiple apparatuses.

BACKGROUND

A user interface enables a user to interact with an apparatus. If the apparatus includes, for example, a touch sensitive display, information may be output by the user interface via the touch sensitive display and inputs may be received via the touch sensitive display.

BRIEF SUMMARY

According to various, but not necessarily all, embodiments of the invention there is provided an apparatus comprising: at least one processor; and at least one memory storing computer program code configured, working with the at least one processor, to cause the apparatus at least to perform: controlling a display to display a user interface, received from a further apparatus; controlling a transmitter to transfer the user interface, received from the further apparatus, to another apparatus different from the further apparatus.

According to various, but not necessarily all, embodiments of the invention there is provided a method, comprising: controlling a display of an apparatus to display a user interface, received from a further apparatus; and controlling a transmitter of the apparatus to transfer the user interface, received from the further apparatus, to another apparatus different from the further apparatus.

According to various, but not necessarily all, embodiments of the invention there is provided a computer program storing computer program code configured, when working with at least one processor, to cause at least the following to be performed: controlling a display of an apparatus to display a user interface, received from a further apparatus; and controlling a transmitter of the apparatus to transfer the user interface, received from the further apparatus, to another apparatus different from the further apparatus.

The computer program described above may be stored on a non-transitory computer readable medium.

According to various, but not necessarily all, embodiments of the invention there is provided a method, comprising: means for controlling a display of an apparatus to display a user interface, received from a further apparatus; and means for controlling a transmitter of the apparatus to transfer the user interface, received from the further apparatus, to another apparatus different from the further apparatus.

According to various, but not necessarily all, embodiments of the invention there is provided an apparatus comprising: at least one processor; and at least one memory storing computer program code configured, working with the at least one processor, to cause the apparatus at least to perform: controlling a display to display a user interface; controlling a transmitter to transfer the user interface to a further apparatus; and controlling the display to indicate that the user interface is currently located at the further apparatus.

According to various, but not necessarily all, embodiments of the invention there is provided a method comprising: controlling a display of an apparatus to display a user interface; controlling a transmitter to transfer the user interface to a further apparatus; and controlling the display to indicate that the user interface is currently located at the further apparatus.

According to various, but not necessarily all, embodiments of the invention there is provided a computer program storing computer program code configured, when working with at least one processor, to cause at least the following to be performed: controlling a display of an apparatus to display a user interface; controlling a transmitter to transfer the user interface to a further apparatus; and controlling the display to indicate that the user interface is currently located at the further apparatus.

The computer program described above may be stored on a non-transitory computer readable medium.

According to various, but not necessarily all, embodiments of the invention there is provided an apparatus, comprising: means for controlling a display to display a user interface; means for controlling a transmitter to transfer the user interface to a further apparatus; and means for controlling the display to indicate that the user interface is currently located at the further apparatus.

According to various, but not necessarily all, embodiments of the invention there is provided an apparatus comprising: at least one processor; and at least one memory storing computer program code configured, working with the at least one processor, to cause the apparatus at least to perform: controlling a display to display a user interface; and responding to gesture input, provided by a user, by causing the user interface to be transferred to a further apparatus.

According to various, but not necessarily all, embodiments of the invention there is provided a method comprising: controlling a display of an apparatus to display a user interface; and responding to gesture input, provided by a user, by causing the user interface to be transferred to a further apparatus.

According to various, but not necessarily all, embodiments of the invention there is provided a computer program storing computer program code configured, when working with at least one processor, to cause at least the following to be performed: controlling a display of an apparatus to display a user interface; and responding to gesture input, provided by a user, by causing the user interface to be transferred to a further apparatus.

The computer program described above may be stored on a non-transitory computer readable medium.

According to various, but not necessarily all, embodiments of the invention there is provided an apparatus, comprising: means for controlling a display to display a user interface; and means for responding to gesture input, provided by a user, by causing the user interface to be transferred to a further apparatus.

According to various, but not necessarily all, embodiments of the invention there is provided an apparatus comprising: at least one processor; and at least one memory storing computer program code configured, working with the at least one processor, to cause the apparatus at least to perform: controlling a touch sensitive display to display a user interface; determining whether a translation input, provided by a user at the touch sensitive display, is provided by the user in a first direction or a second direction; if the translation input is provided in the first direction, responding by treating the translation input as a command to transfer the user interface to a further apparatus; and if the translation input is provided in the second direction, responding by treating the translation input as an input for navigating the user interface at the apparatus.

According to various, but not necessarily all, embodiments of the invention there is provided a method, comprising: controlling a touch sensitive display of an apparatus to display a user interface; determining whether a translation input, provided by a user at the touch sensitive display, is provided by the user in a first direction or a second direction; if the translation input is provided in the first direction, responding by treating the translation input as a command to transfer the user interface to a further apparatus; and if the translation input is provided in the second direction, responding by treating the translation input as an input for navigating the user interface at the apparatus.

According to various, but not necessarily all, embodiments of the invention there is provided a computer program storing computer program code configured, when working with at least one processor, to cause at least the following to be performed: controlling a touch sensitive display of an apparatus to display a user interface; determining whether a translation input, provided by a user at the touch sensitive display, is provided by the user in a first direction or a second direction; if the translation input is provided in the first direction, responding by treating the translation input as a command to transfer the user interface to a further apparatus; and if the translation input is provided in the second direction, responding by treating the translation input as an input for navigating the user interface at the apparatus.

The computer program described above may be stored on a non-transitory computer readable medium.

According to various, but not necessarily all, embodiments of the invention there is provided an apparatus, comprising: means for controlling a touch sensitive display to display a user interface; means for determining whether a translation input, provided by a user at the touch sensitive display, is provided by the user in a first direction or a second direction; means for responding, if the translation input is provided in the first direction, by treating the translation input as a command to transfer the user interface to a further apparatus; and means for responding, if the translation input is provided in the second direction, by treating the translation input as an input for navigating the user interface at the apparatus.

BRIEF DESCRIPTION

For a better understanding of various examples that are useful for understanding the brief description, reference will now be made by way of example only to the accompanying drawings in which.

DETAILED DESCRIPTION

Figure 1:
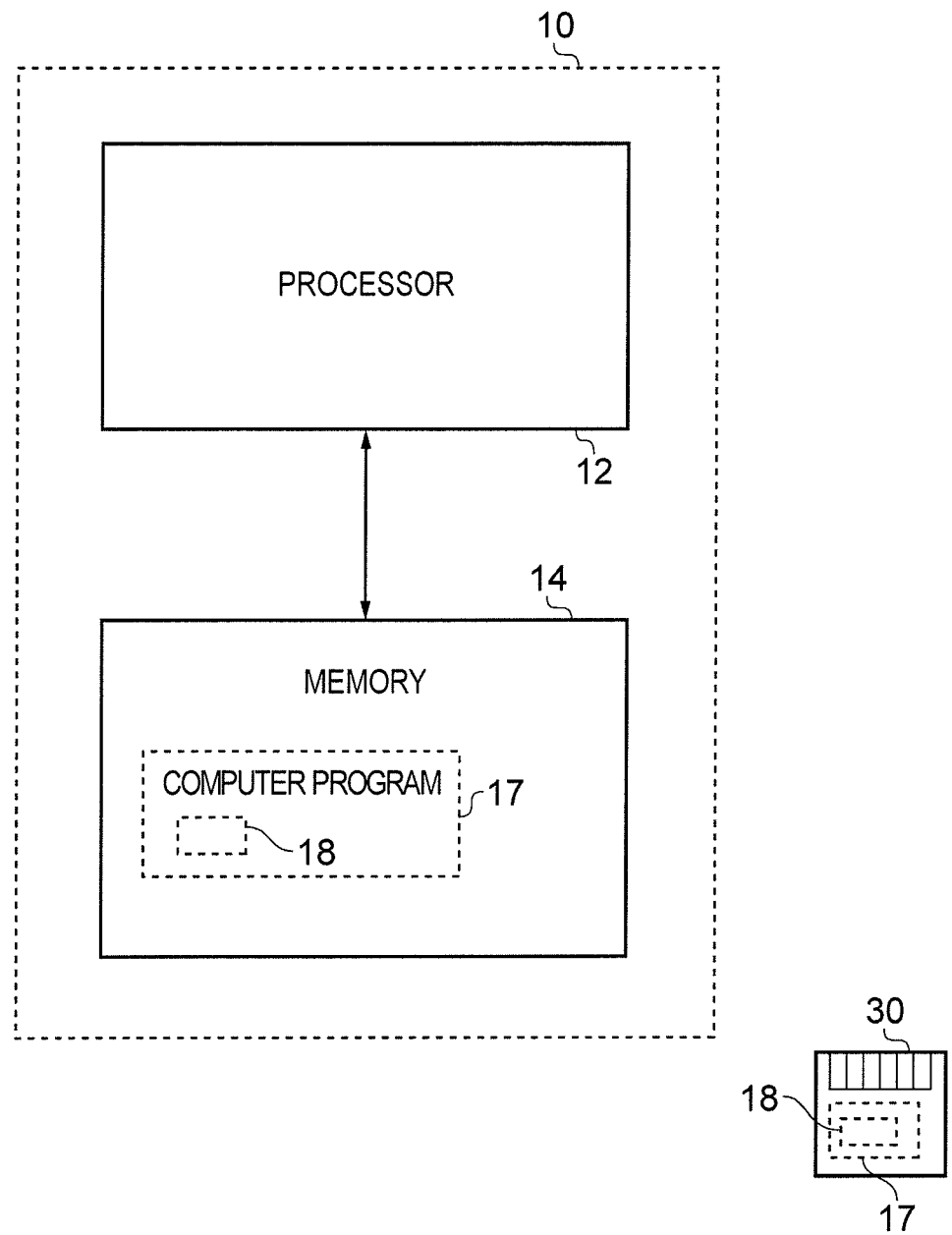
FIG. 1 illustrates a schematic of an apparatus such as a chip or chipset.

Embodiments of the invention relate to sharing a user interface between multiple apparatuses.

In this regard, the figures illustrate an apparatus 10/20/100 comprising: at least one processor 12; and at least one memory 14 storing computer program code 18 configured, working with the at least one processor 12, to cause the apparatus 10/20/100 at least to perform: controlling a display 6/8 to display a user interface 30; controlling a transmitter 4 to transfer the user interface 30 to a further apparatus 200; and controlling the display 6/8 to indicate that the user interface is currently located at the further apparatus 200.

The figures also illustrate an apparatus 10/20/200 comprising: at least one processor 12; and at least one memory 14 storing computer program code 18 configured, working with the at least one processor 12, to cause the apparatus 10/20/200 at least to perform: controlling a display 6/8 to display a user interface 30, received from a further apparatus 100; controlling a transmitter 4 to transfer the user interface 30, received from the further apparatus 100, to another apparatus 300 different from the further apparatus 100.

FIG. 1 illustrates a first apparatus 10 comprising a processor 12 and a memory 14. The apparatus 10 may, for example, be a chip or a chipset.

The processor 12 is configured to read from and write to the memory 14. The processor 12 may comprise an output interface via which data and/or commands are output by the processor 12 and an input interface via which data and/or commands are input to the processor 12. Although the processor 12 is illustrated as a single component in FIG. 1, it may be implemented as one or more separate components.

The memory 14 stores a computer program 17 comprising computer program instructions/code 18 that control the operation of the apparatus 10 when loaded into the processor 12. The computer program code 18 provides the logic and routines that enables the apparatus 10 to perform at least part of the method illustrated in FIG. 12. The processor 12, by reading the memory 14, is able to load and execute the computer program 17.

Although the memory 14 is illustrated as a single component it may be implemented as one or more separate components some or all of which may be integrated/removable and/or may provide permanent/semi-permanent/dynamic/cached storage.

The computer program 17 may arrive at the apparatus 10 via any suitable delivery mechanism 30. The delivery mechanism 30 may be, for example, a non-transitory computer-readable storage medium such as a compact disc read-only memory (CD-ROM) or digital versatile disc (DVD). The delivery mechanism 30 may be a signal configured to reliably transfer the computer program 17. The apparatus 10 may cause the propagation or transmission of the computer program 17 as a computer data signal.

Figure 2:
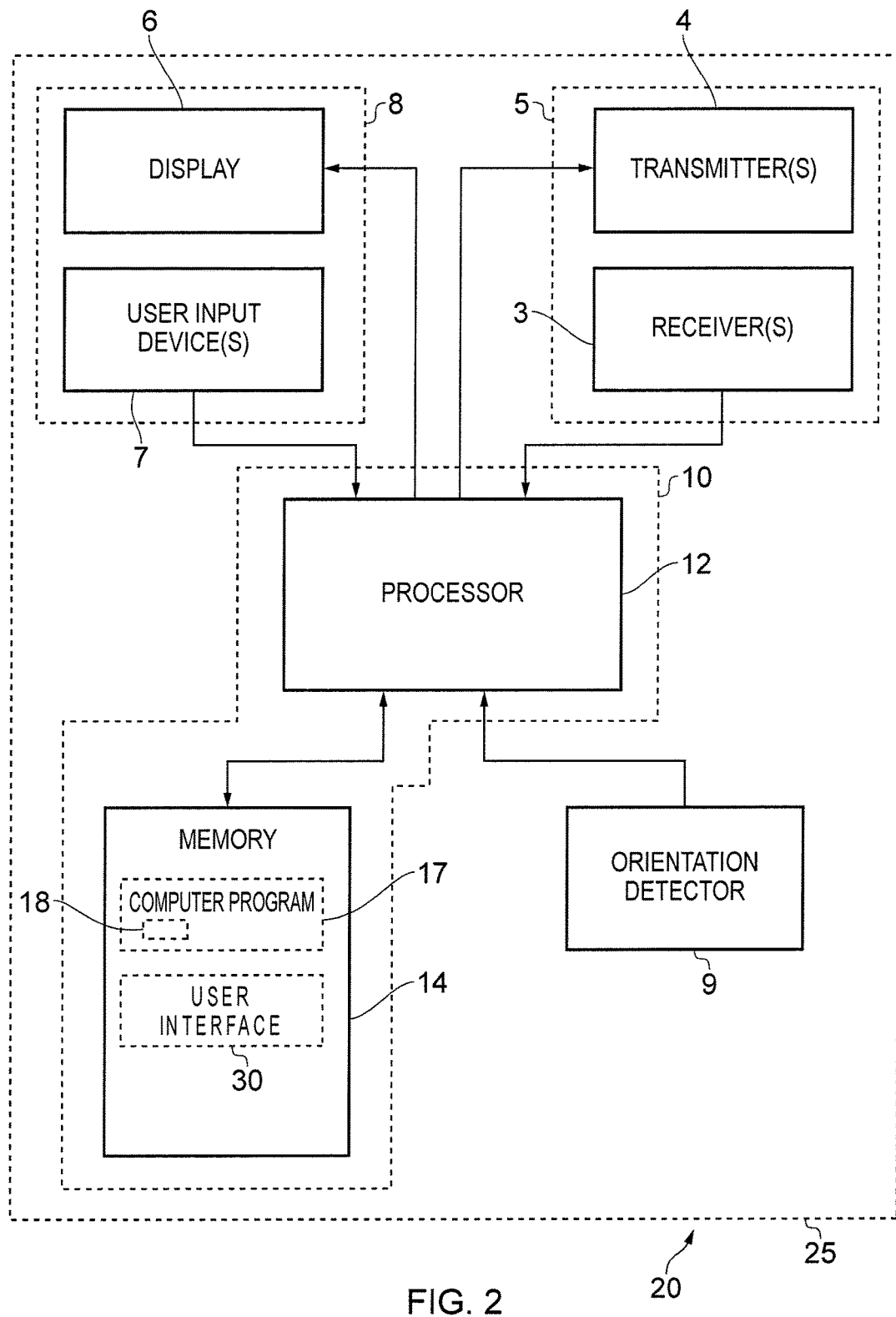
FIG. 2 illustrates a schematic of an apparatus such as a portable electronic device.

FIG. 2 illustrates a further apparatus 20. The further apparatus 20 is an electronic device. It may, for example, be a hand portable electronic device such as a mobile telephone, a hand portable music player, a tablet computer or a dedicated handheld games console.

The apparatus 20 illustrated in FIG. 2 includes one or more receivers 3, one or more transmitters 4, a display 6, one or more user input devices 7, an orientation detector 9, an external housing 25 and the apparatus 10 illustrated in FIG. 1. The external housing 25 houses the one or more receivers 3, the one or more transmitters 4, the display 6, the one or more user input devices 7, the orientation detector 9, the processor 12 and the memory 14.

The display 6 is configured to display information under the control of the processor 12. The display 6 may be any type of display. It may, for example, be a liquid crystal display (LCD), an organic light emitting diode (OLED) display or a quantum dot display.

The one or more user input devices 7 are configured to receive inputs from a user. In response to receiving an input from a user, the one or more user input devices 7 provide a signal to the processor 12 that depends upon the input that has been provided by the user.

In some embodiments of the invention, the apparatus 20 comprises a user input device 7 that is integrated with the display 6, in the form of a touch sensitive display 8. The touch sensitive display 8 may be any type of touch sensitive display. It might function, for example, using capacitive, resistive, infrared, dispersive signal and/or acoustic pulse technology.

The one or more receivers 3 are configured to receive data from other apparatuses. The one or more transmitters 4 are configured to transmit data to other apparatuses. The one or more receivers 3 and the one or more transmitters 4 may form part of more or more transceivers 5. In this regard, some or all of the components of a receiver 3 and a transmitter 4 may be shared.

At least one of the transceivers 5 may be configured to transmit and receive radio frequency signals. The transceiver(s) 5 might be compatible with one or more radio protocols, such as Bluetooth protocols or IEEE (Institute of Electrical and Electronic Engineers) protocols.

The orientation detector 9 is configured to detect the orientation of the apparatus 20. It may, for example, include one or more gyroscopes.

The memory 14 is illustrated in FIG. 2 as storing a user interface 30 in the form of data.

The elements 3, 4, 6, 7, 9, 12 and 14 are operationally coupled and any number or combination of intervening elements can exist between them (including no intervening elements).

Figure 3:
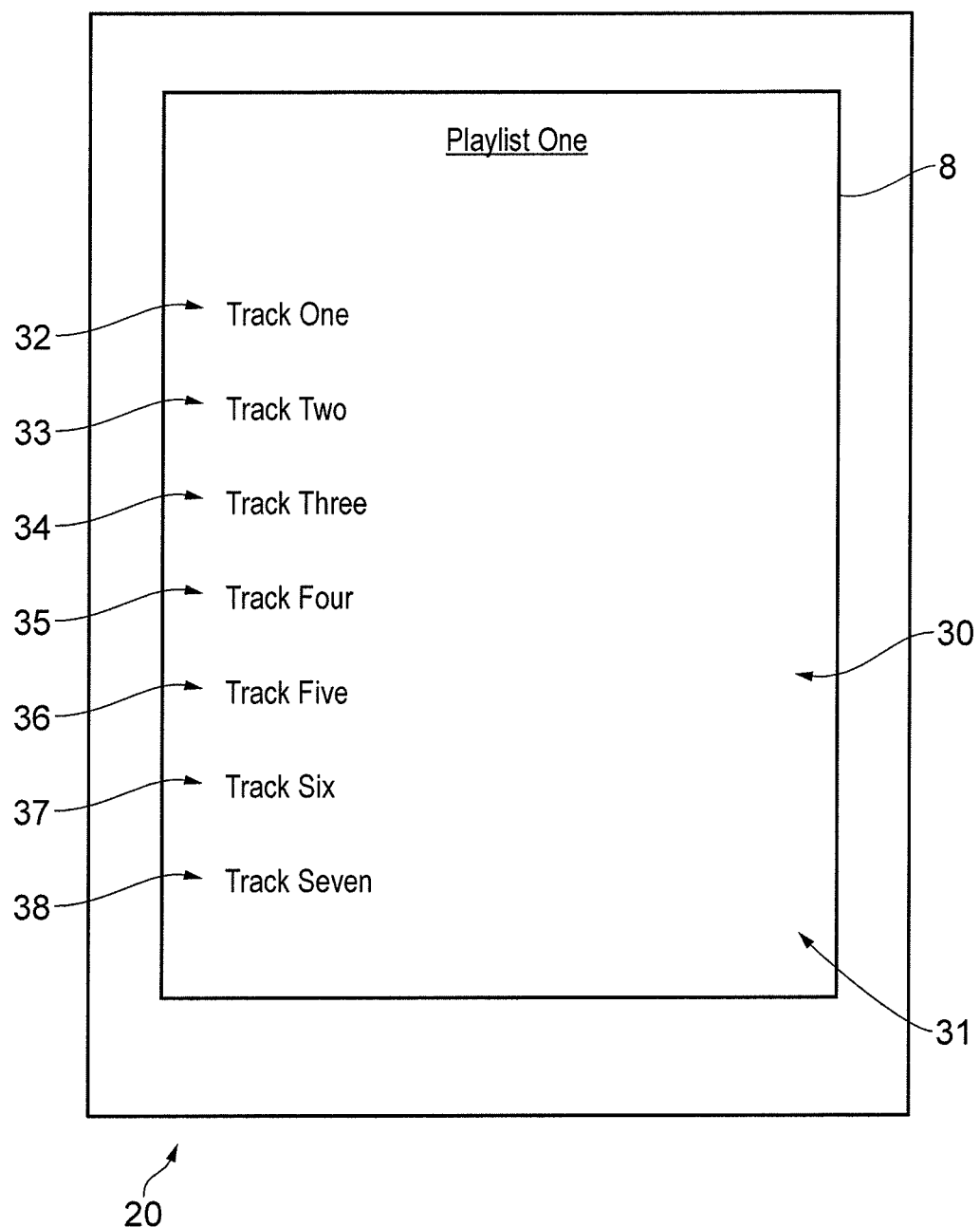
FIG. 3 illustrates a front elevation of the apparatus illustrated in FIG. 2.

FIG. 3 illustrates a front elevation of the apparatus 20 illustrated in FIG. 2, while the processor 12 is controlling the touch sensitive display 8 to display a user interface 30 that enables a user to access media content. A screen 31 of the user interface 30 is being displayed which relates to a playlist named "Playlist One". The media content in this example is audio tracks, but in other examples it could be images, photographs or videos. The media content may be stored locally in the memory 14 or remotely.

The user interface 30 may form part of an operating system stored locally in the memory 14 or part of an application locally stored in the memory 14.

The user interface 30 may consist of a single screen, or it may include multiple different screens. The user may navigate between different screens of the user interface 30 by providing user input, for example, at the touch sensitive display 8.

The user interface 30 may comprise one or more items, at least some of which are user selectable. The user selectable items may, for example, be selectable via the touch sensitive display 8. At least some of the items may be graphical items, such as images/icons. Alternatively or additionally, at least some of the items may be text items.

The screen 31 of the user interface 30 that is displayed in FIG. 3 comprises first, second, third, fourth, fifth, sixth, seventh and eighth text items 32-38. Each of the items 32-38 corresponds with a media content item which, in this example, is an audio track. The media content items may be stored locally in the memory 14 or remotely.

User selection of a particular one of the items 32-38 causes the processor 12 to respond by controlling the apparatus 20 to begin outputting media content, in the order specified by the playlist, starting from the media content item that corresponds with the selected text item. The media content may be output by the apparatus 20 directly to the user, for example, via an output device that forms part of the apparatus 20 (such as a loudspeaker or a headphone jack). Alternatively, the media content may be output by the apparatus 20 to an external media content output device such as an external loudspeaker, an external stereo system a television or a computer.

For example, user selection of item 33 including the text "Track Two" causes the apparatus 20 to begin outputting the tracks in "Playlist One" starting from "Track Two".

User selection of an item may be performed, for example, by providing touch input at the item. The touch input could, for example, be performed using a digit or a stylus.

In some embodiments of the invention, the processor 12 is also configured to respond to a gesture input made by a user. The gesture input may, for example, be a translation input. A translation input may, for example, be made by displacing an object (such as a digit or a stylus) from a start point to an end point.

Figure 4B:
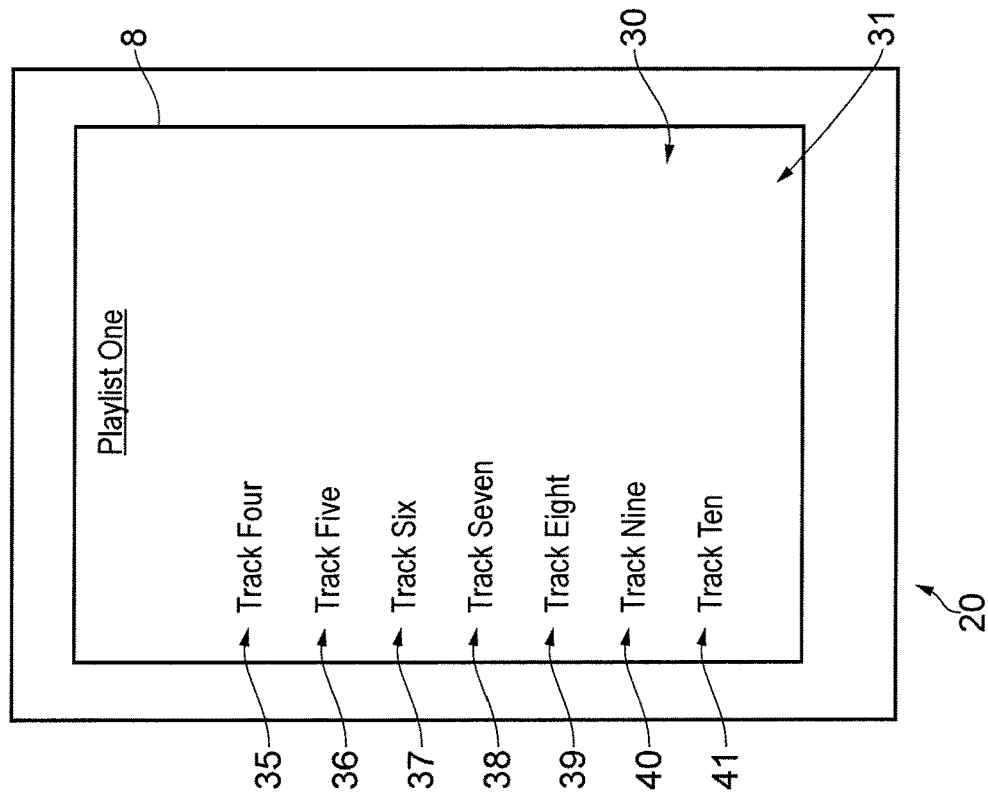
FIG. 4B illustrates the apparatus illustrated in FIG. 4A after the apparatus has responded to the first translation input.
Figure 4A:
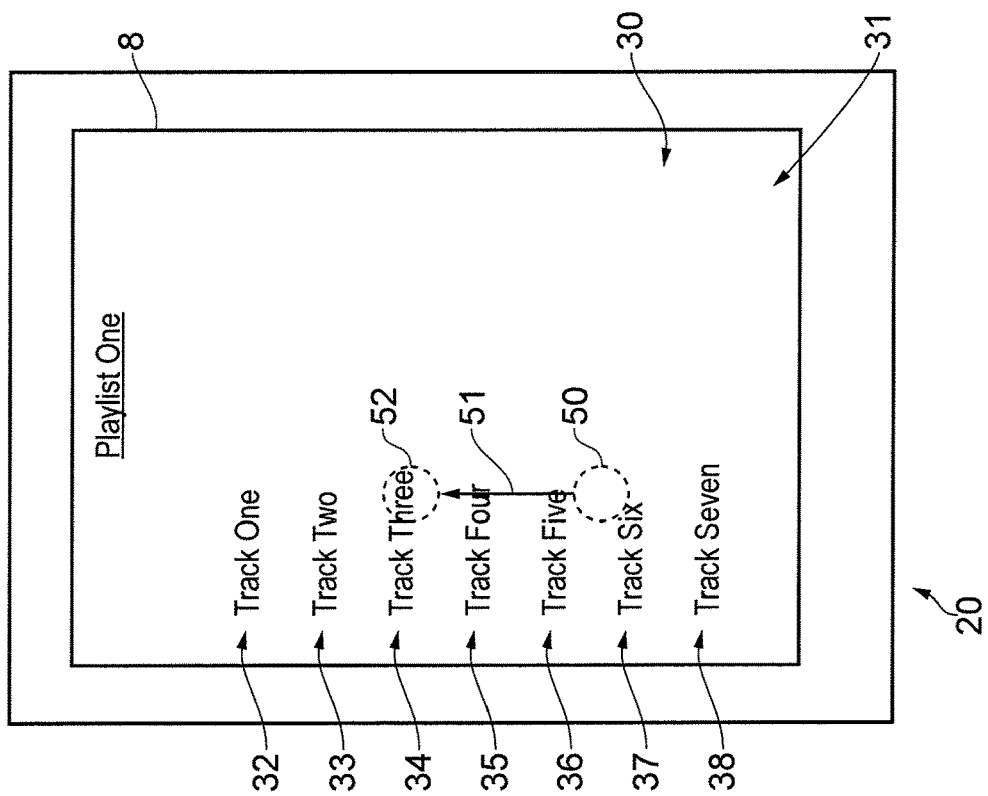
FIG. 4A illustrates a first translation input being made at the apparatus illustrated in FIG. 3.

FIG. 4A illustrates an example as to how a translation input may be made from a start point 50 to an end point 52. In the illustrated example, an object (such as a digit or a stylus) is placed in contact with the display 8 at the start point 50 and moved across the display 8, while it is in contact with the display 8, in the direction of the arrow 51 until the end point 52 is reached.

FIG. 4A illustrates the apparatus 20 displaying the same user interface screen 31 as that illustrated in FIG. 3. In this example, when the user provides the translation input in a direction that is substantially parallel with the direction in which list of items 32-38 extend, as illustrated in FIG. 4A, the processor 12 responds by causing the list of items 32-38 to be scrolled as the translation input is being provided. The translation input is therefore interpreted by the processor 12 as a command for navigating the user interface at the apparatus 20.

FIG. 4B illustrates the user interface screen 31 after the scrolling has occurred. It can be seen from FIG. 4B that the scrolling of the items 32-38 has resulted in the upper three items, 32-34, corresponding with media content items "Track One", "Track Two" and "Track Three" being removed from the display 8. Also, four items 35-38 (corresponding with the media content items "Track Four", "Track Five", "Track Six", and "Track Seven") have been moved upwards and three new items 39-41 are displayed in the list (corresponding with the media content items "Track Eight", "Track Nine" and "Track Ten").

Figure 5B:
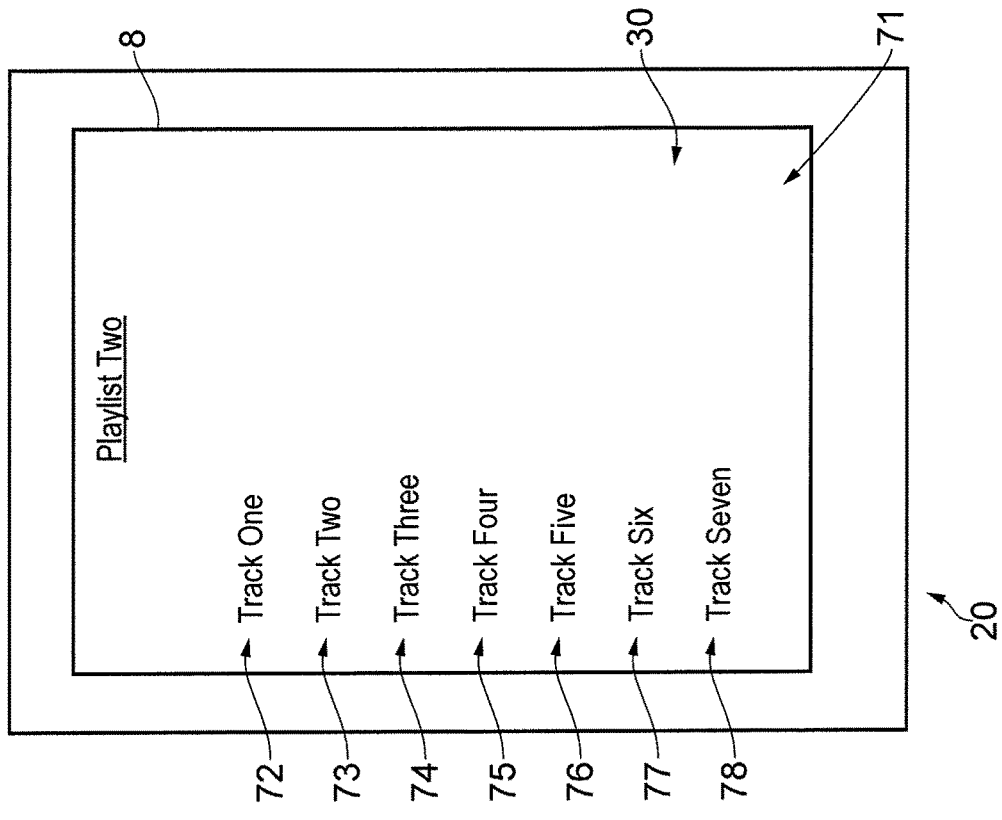
FIG. 5B illustrates the apparatus illustrated in FIG. 5A after the apparatus has responded to the second translation input.
Figure 5A:
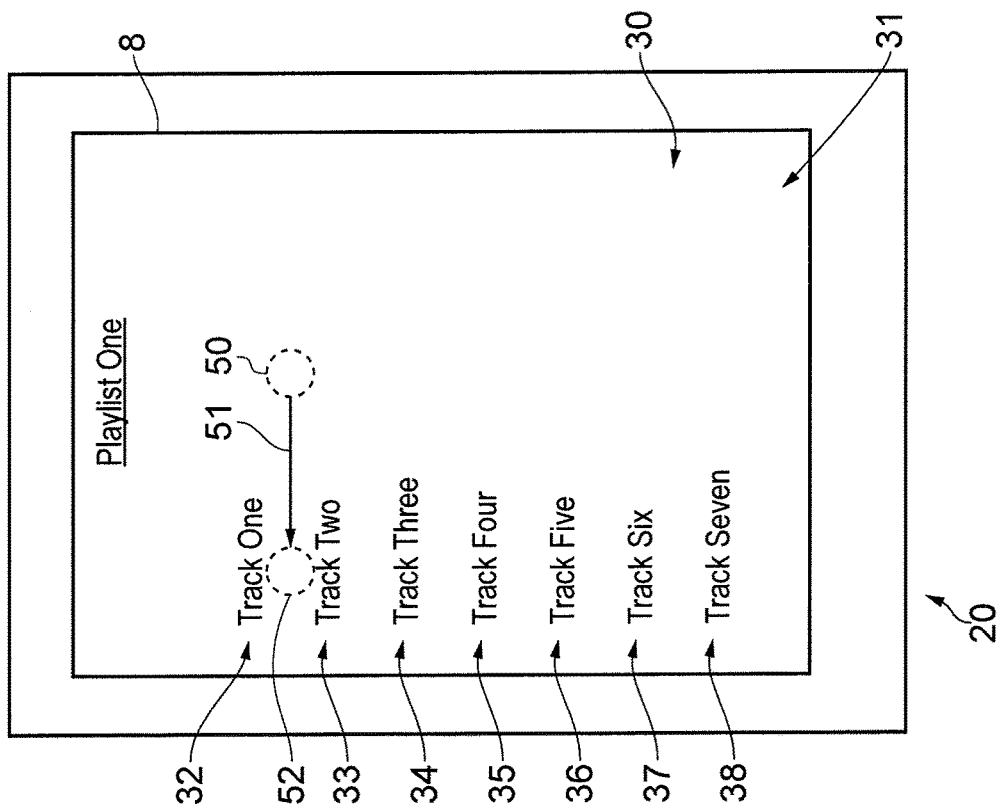
FIG. 5A illustrates a second translation input being made at the apparatus illustrated in FIG. 3.

FIG. 5A illustrates the apparatus 20 displaying the same user interface screen 31 as that illustrated in FIG. 3. In this example, the user provides a translation input in a direction that is substantially perpendicular to the direction in which the translation input is provided in FIG. 4A. The processor 12 responds to this translation input by changing the screen of the user interface 30 that is displayed on the display 8. The translation input provided in FIG. 5A is interpreted by the processor 12 as a different command for navigating the user interface at the apparatus 20 from that described above in relation to FIGS. 4A and 4B.

FIG. 5B illustrates the screen 71 of the user interface 30 that is displayed in response to the translation input being provided in FIG. 5A. In this example, the screen 71 displayed in FIG. 5B relates to a different playlist including different media content items 72-78 (tracks). The user may scroll through the items 72-78 by providing a translation input as described above in relation to FIGS. 4A and 4B.

Figure 6:
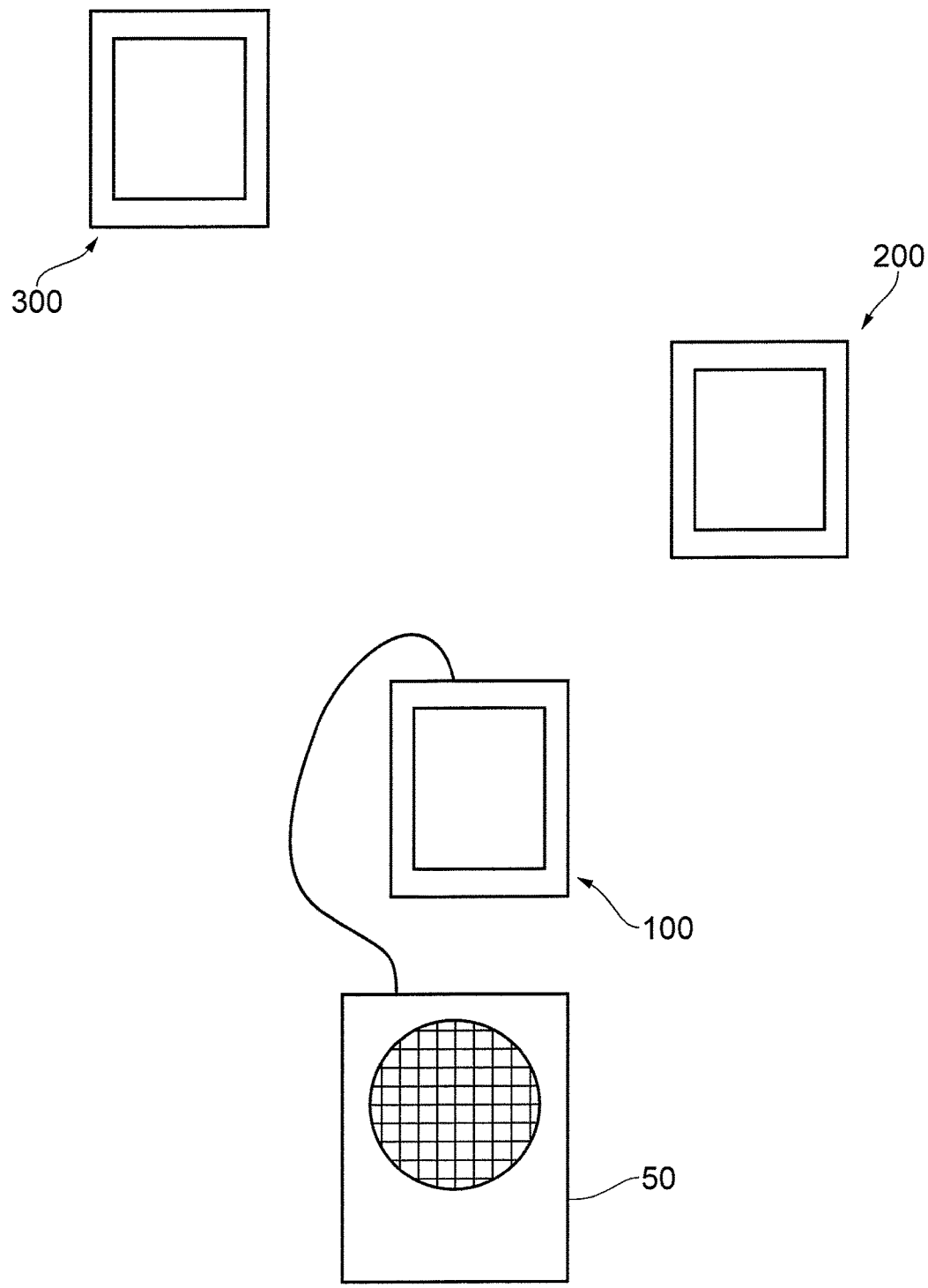
FIG. 6 illustrates first, second and first apparatuses, where the first apparatus is in communication with a media output device.

FIG. 6 illustrates a first apparatus 100, a second apparatus 200 and a third apparatus 300. In this example, each of the first, second and third apparatuses 100, 200, 300 has the same form as the apparatus 20 described above in relation to FIGS. 2 to 5B. FIG. 6 illustrates the first apparatus 100 connected to a media content output device 50 that, in this example, is a loudspeaker. In other examples it may, for instance, be a computer, a television or a stereo system. A wired connection between the first apparatus 100 and the media content output device 50 is illustrated in FIG. 6 but, in practice, it could be a wireless connection instead.

The first apparatus 100 is arranged to output media content to the media content output device 50, which then outputs the media content to the users in the form of visible information and/or audible signals. For example, the first apparatus 100 may output audio tracks to the media content output device 50 as digital or analogue data, and the audio tracks are then output as audio signals by the media content output device 50.

In this particular example, the first, second and third apparatuses 100, 200, 300 are connected to each other in a wireless network using their transceivers 5. Each apparatus 100, 200, 300 is able to communicate wirelessly with the other apparatuses 100, 200, 300.

Each apparatus 100, 200, 300 is able to determine its own position relative to the other apparatuses 100, 200, 300. In some implementations of the invention, each apparatus 100, 200, 300 may determine its position relative to the other apparatuses periodically over time.

An apparatus 100, 200, 300 may, for instance, determine its position relative to the other apparatuses 100, 200, 300 using radio signals transmitted and received by its transceiver 5. In order to determine its position, an apparatus 100, 200, 300 may transmit and/or receive radio signals to/from the other apparatuses 100, 200, 300 and/or an access point (for example, an 802.11 wireless local area network access point). In some examples, one or more of the apparatuses 100, 200, 300 may comprise a satellite positioning receiver for determining its position.

A method according to embodiments of the invention will now be described using the flow chart illustrated in FIG. 12.

Figure 12:
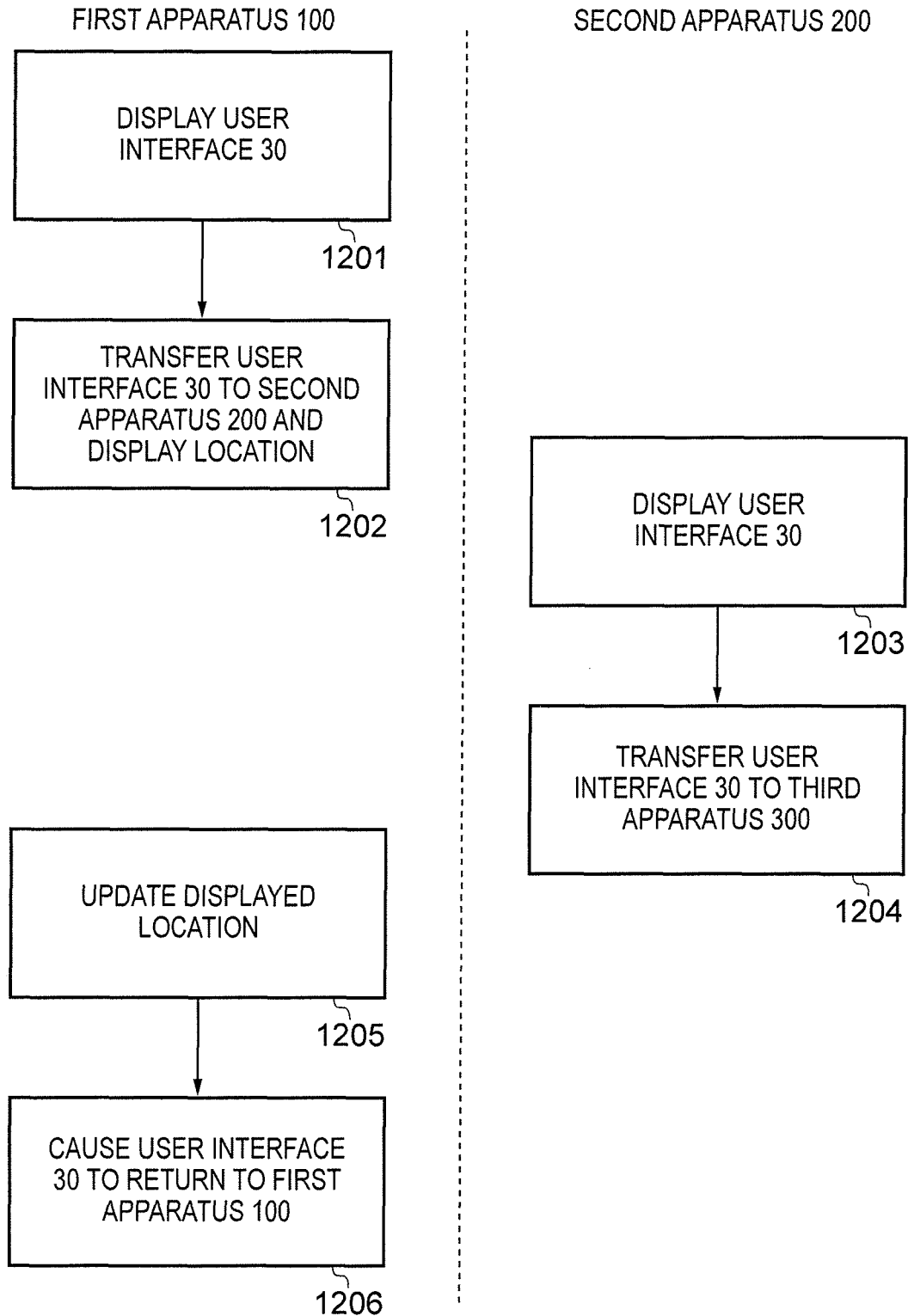
FIG. 12 illustrates a flow chart of a method.

At block 1201 in FIG. 12, the processor 12 of the first apparatus 100 controls the display 8 of the first apparatus 100 to display the user interface 30 described above. The display 8 may, for example, display the screen 30 illustrated in FIGS. 3, 4A and 5A.

At block 1202 in FIG. 12, the user of the first apparatus 100 provides a gesture input, at the first apparatus 100, in response to which the processor 12 of the first apparatus 100 causes a transmitter 4 of the first apparatus 100 to transfer the user interface 30 to the second apparatus 200. The media content items/files that correspond with the items 32-41 in the user interface 30 are not, however, transferred.

Figure 7:
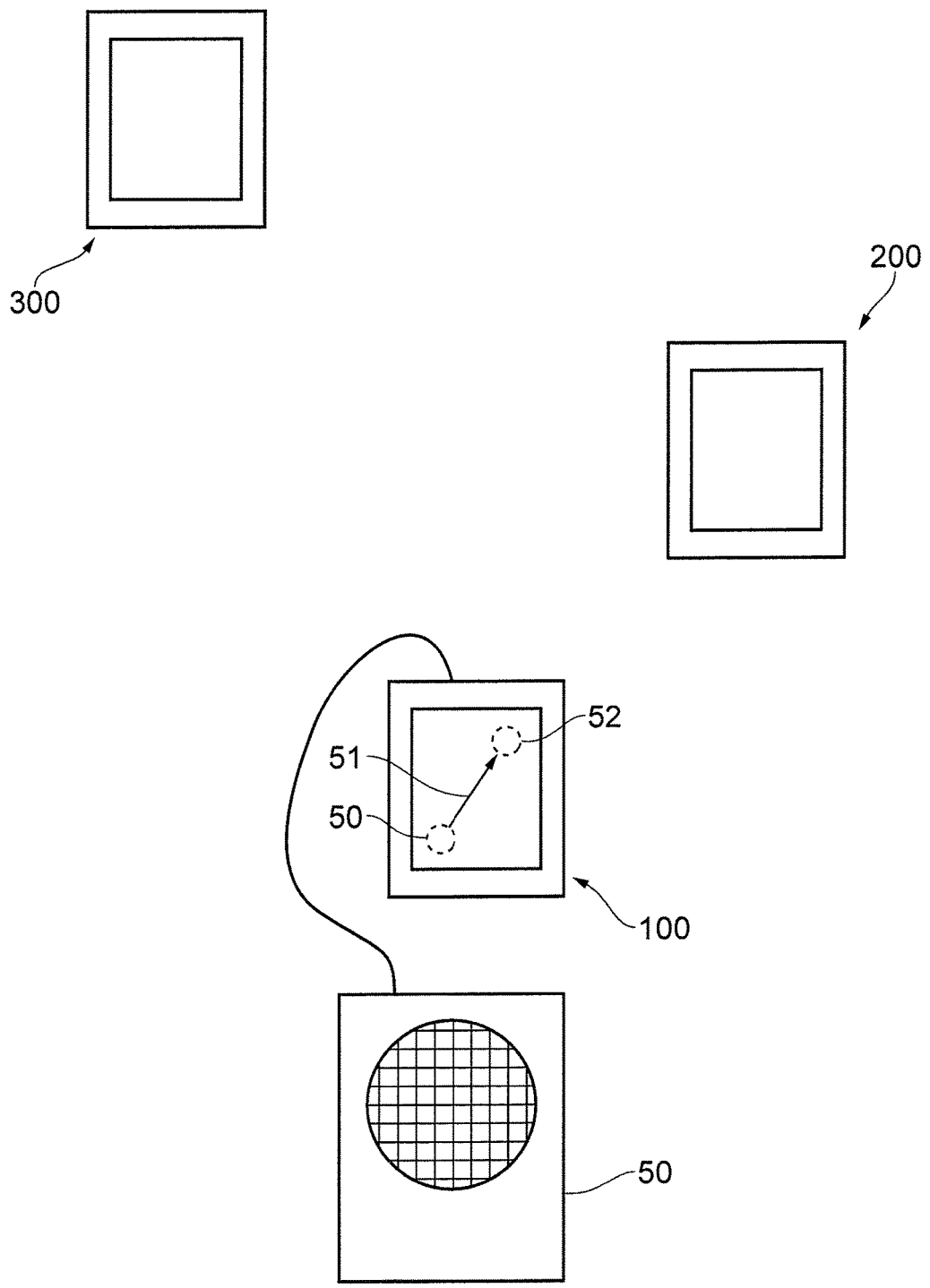
FIG. 7 illustrates a third translation input being provided at the first apparatus illustrated in FIG. 6.

In this example, the gesture input that is provided by the user is a translation input as illustrated in FIG. 7. The translation input illustrated in FIG. 7 is in a different direction from the translation input illustrated in FIG. 4A and the translation input illustrated in FIG. 5A.

The translation input illustrated in FIG. 7 is directed diagonally across the display 12. It has a component in the same direction as the translation input illustrated in FIG. 4A and a component in the same direction as the translation input illustrated in FIG. 5A.

It can be seen from the relative positioning of the first apparatus 100 and the second apparatus 200 in FIG. 7 that the translation input illustrated in FIG. 7 can be considered to be a gesture input that is directed towards the second apparatus 200. Advantageously, when providing the translation input at the first apparatus 100, the act of providing the translation input at the first apparatus 100 makes the user feel as if he is "flicking" the user interface 30 to the second apparatus 200.

When the input illustrated in FIG. 7 is provided by the user at the touch sensitive display 8 of the apparatus 100, the processor 12 determines whether the input is, in fact, a translation input. If the input were a translation input provided in the direction illustrated in FIG. 4A, the processor 12 would respond by treating the input as a command for navigating the user interface 30 by scrolling the list of displayed items 32-38, as described above in relation to FIGS. 4A and 4B.

If the input were a translation input provided in the direction illustrated in FIG. 5A, the processor 12 would respond by treating the input as a command for navigating the user interface 30 by changing the screen of the user interface 30 that is displayed on the display 8, as described above in relation to FIGS. 5A and 5B.

However, in this instance, the input is a translation input that is provided in a direction that is different from the direction of the translation inputs illustrated in FIGS. 4A and 5A. When the processor 12 has determined this, it treats the translation input as a command to transfer the user interface to a different apparatus 200.

In this particular example, the user of the first apparatus 100 could have chosen to transfer the user interface 30 to the second apparatus 200 or the third apparatus 300.

When the processor 12 determines that a diagonal translation input has been provided by the user, it analyses the translation input in relation to the orientation of the first apparatus 100, which is provided by the orientation detector 9, and the position of the second and third apparatuses 200, 300 relative to the position of the first apparatus 100. In this example, after determining that the gesture/translation input is directed towards the second apparatus 200 rather than the third apparatus 300, the processor 12 of the first apparatus 100 decides to transfer the user interface to the second apparatus 200.

Figure 8:
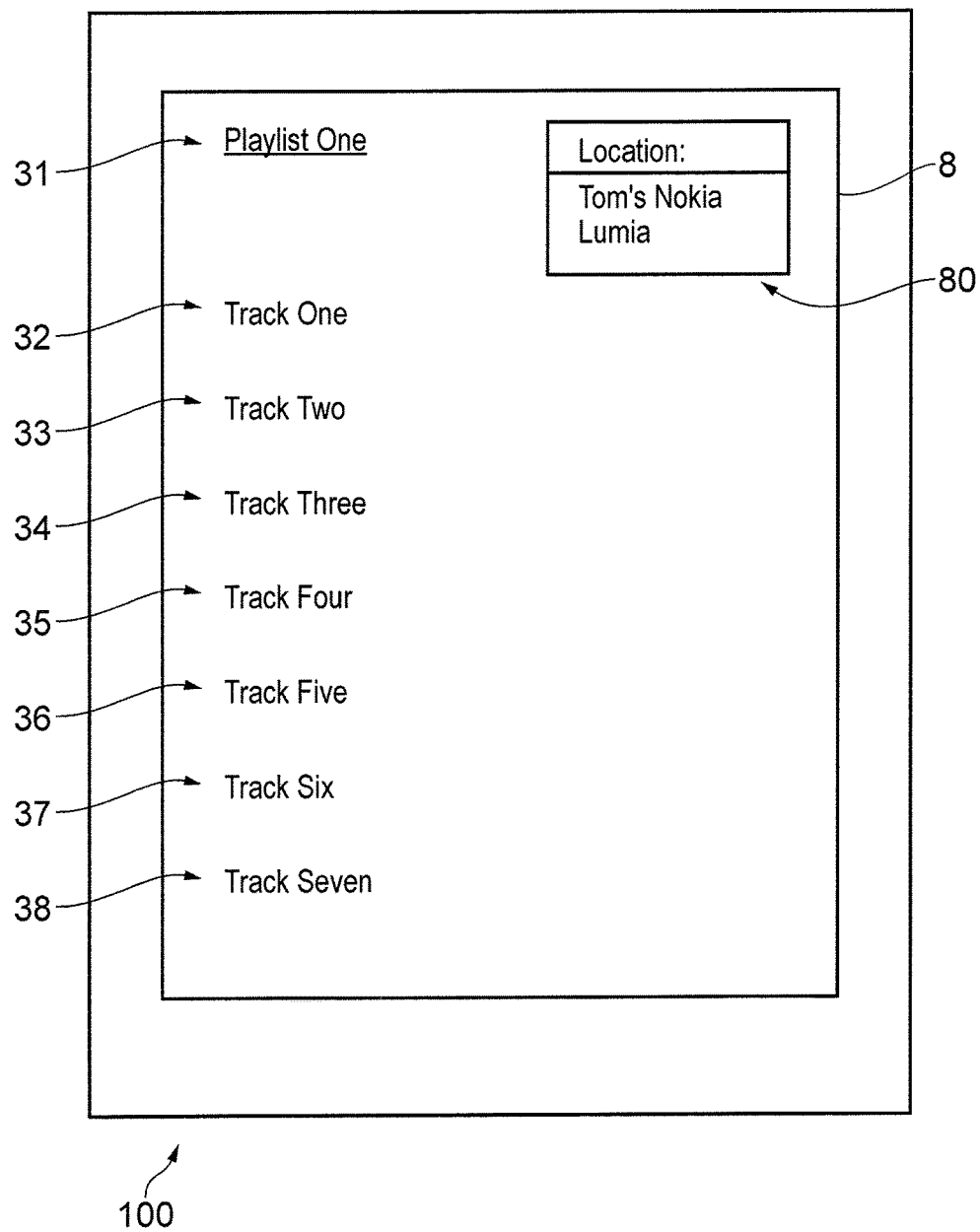
FIG. 8 illustrates the first apparatus illustrated in FIG. 6 after the first apparatus has responded to the third translation input.

After the user interface 30 has been sent to the second apparatus 200, the processor 12 of the first apparatus 100 may control the display 8 of the first apparatus 100 to indicate that the user interface 30 is currently located at the second apparatus 200. In this particular example, the user of the second apparatus 200 is named Tom. Thus, FIG. 8 illustrates the display 8 of the first apparatus 100 displaying an indication 80 on the display 8 that the user interface 30 is currently located at (and displayed on) Tom's Nokia Lumia (the second apparatus 200). The identifier "Tom's Nokia Lumia" is provided to the first apparatus 100 by the second apparatus 200.

In response to reception of the user interface 30 from the first apparatus 100 (at a receiver 3 of the second apparatus 200), the processor 12 of the second apparatus 200 controls the display 8 of the second apparatus 200 to display the user interface 30 at block 1203 in FIG. 12.

The user of the second apparatus 200 is able to interact with the user interface 30 when it is displayed on the display 8 of the second apparatus 200. For example, he is able to scroll the items 32-38 as described above in relation to FIGS. 4A and 4B. In the event that the transferred user interface 30 includes multiple screens, he may also be able to navigate between the screens, for example, as described above in relation to FIGS. 5A and 5B.

In some embodiments, once the user interface 30 has been transferred from the first apparatus 100 to the second apparatus 200, the processor 12 of the first apparatus 100 controls the display 8 of the first apparatus 100 to cease displaying the user interface 30. In other embodiments, such as that illustrated in FIG. 8, the display 8 continues to display the user interface 30. In such embodiments, the second apparatus 200 may send data to the first apparatus 100 to enable the display 8 of the first apparatus 100 to display the navigation actions being performed by the user of the second apparatus 200 (for example, in real time).

The user interface 30 displayed at the second apparatus 200 enables the user of the second apparatus 200 to control the first apparatus 100, at least to some extent. For example, the user interface 30 may enable the user of the second apparatus 200 to control media content output by the first apparatus 100. The user of the second apparatus 200 might be able to control the media content that is currently being output (to the media output device 50) by the first apparatus 100 and/or control which media content will be output in the future by the first apparatus 100 (for example, by adding a media content, such as an audio track, to the playlist).

In some examples, the media content that is output by the first apparatus 100 is stored in the memory 14 of the first apparatus 100. In other examples, the media content is stored remotely from the first apparatus 100, streamed using its receiver 3 and output by the first apparatus 100 to the media output device 50. This may be the case, for example, if the first apparatus 100 has access to a cloud/online music service.

In some implementations it may be possible, for example, for the user of the second apparatus 200 to use the transferred user interface 30 to control some aspect of the second apparatus 200. For example, the user may be able to use the user interface 30 to insert media content, accessible by the second apparatus 200, into the playlist. The media content could, for example, be stored in the memory 14 of the second apparatus 200. At the appropriate point in time (for example, when a track stored in the memory 14 of the second apparatus 200 is due to be played), the second apparatus 200 may stream media content to the media output device 50, either directly or via the first apparatus 100, to enable that media content to be consumed by the users of the first, second and third apparatuses 100, 200, 300 via the media output device 50.

The user of the second apparatus 200 may be able to use the user interface 30 to insert media content into the playlist which will be streamed by the second apparatus 200 from a cloud (music) service. For example, if the media content is an audio track, when the audio track is due to be played, the second apparatus 200 may stream the media content/track from the cloud service, and then stream the media content/track to the media output device 50, either directly or via the first apparatus 100.

At block 1204 of FIG. 12, the user of the second apparatus 200 provides a gesture input at the second apparatus 200 which causes the processor 12 of the second apparatus 200 to respond by controlling a transmitter 4 of the second apparatus 200 to transfer the user interface 30 (which was received from the first apparatus 100) to the third apparatus 300.

Figure 9:
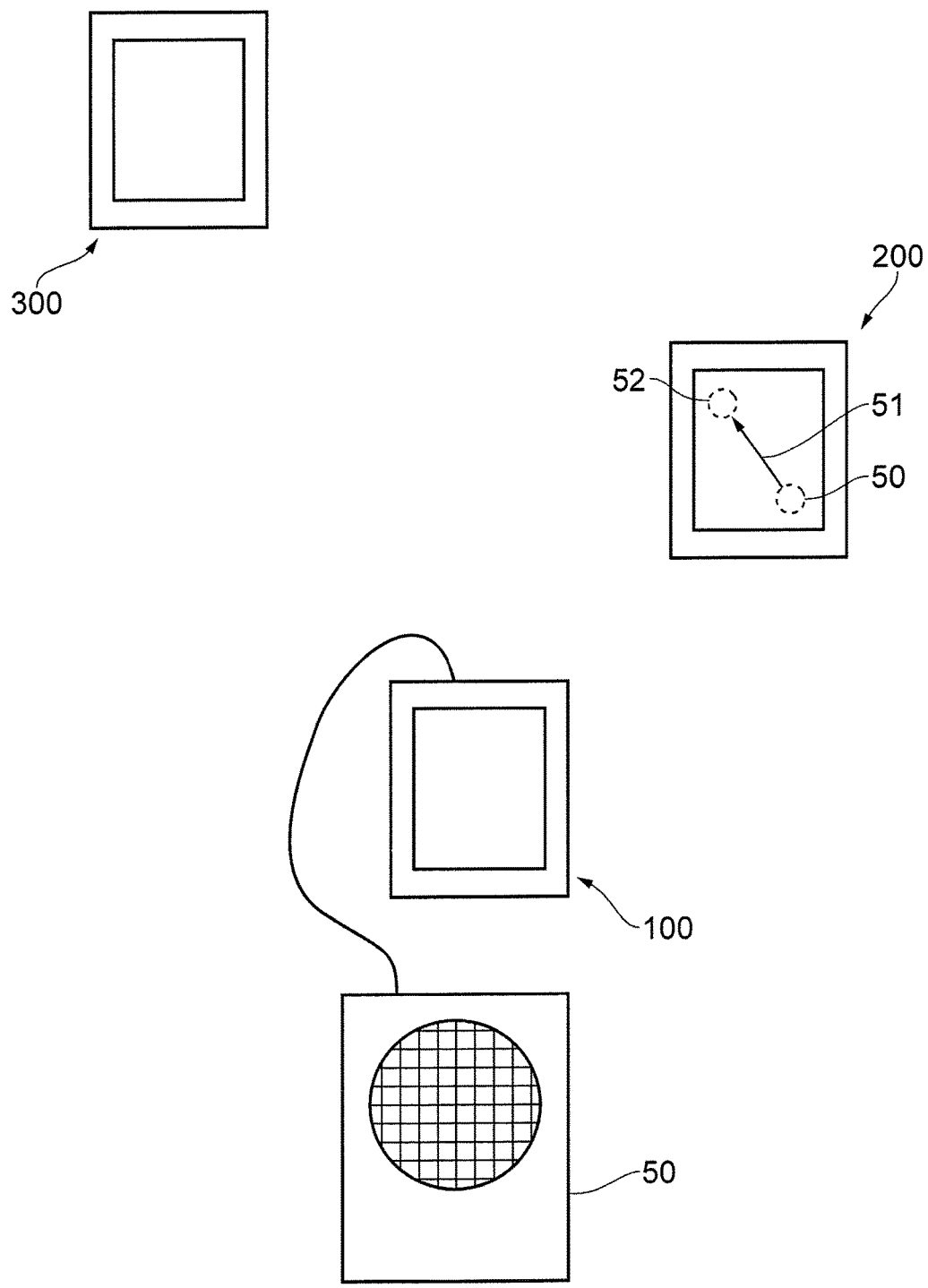
FIG. 9 illustrates a fourth translation input being provided at the second apparatus illustrated in FIG. 6.

In this example, the gesture input that is provided by the user is a translation input at the display 8, as illustrated in FIG. 9. The processor 12 of the second apparatus 200 determines, using the same process as that described above in relation to the first apparatus 100, that the translation input is a command to transfer the user interface 30 to another apparatus rather than a navigation input.

The processor 12 of the second apparatus 200 also determines, based upon the direction of the translation input on the display 8, the position of the second apparatus 200 relative to the first and third apparatuses 100, 300 and the orientation of the second apparatus 200, that the translation input is directed towards the third apparatus 300 and therefore interprets it as a command to transfer the user interface 30 from the second apparatus 200 to the third apparatus 300.

When the user interface 30 is transferred from the second apparatus 200 to the third apparatus 300, the processor 12 of the second apparatus 200 controls the display 8 of the second apparatus 200 to cease displaying the user interface 30. At least one of the second apparatus 200 and the third apparatus 300 transmits data to the first apparatus 100 indicating that the user interface 30 has been transferred to the third apparatus 300.

At block 1205 in FIG. 12, in response to reception of the data transmitted by the second apparatus 200 and/or the third apparatus 300, the processor 12 responds by controlling the display 8 to update the indication 80 of the current location of the user interface 30 that is displayed on the display 8.

Figure 10:
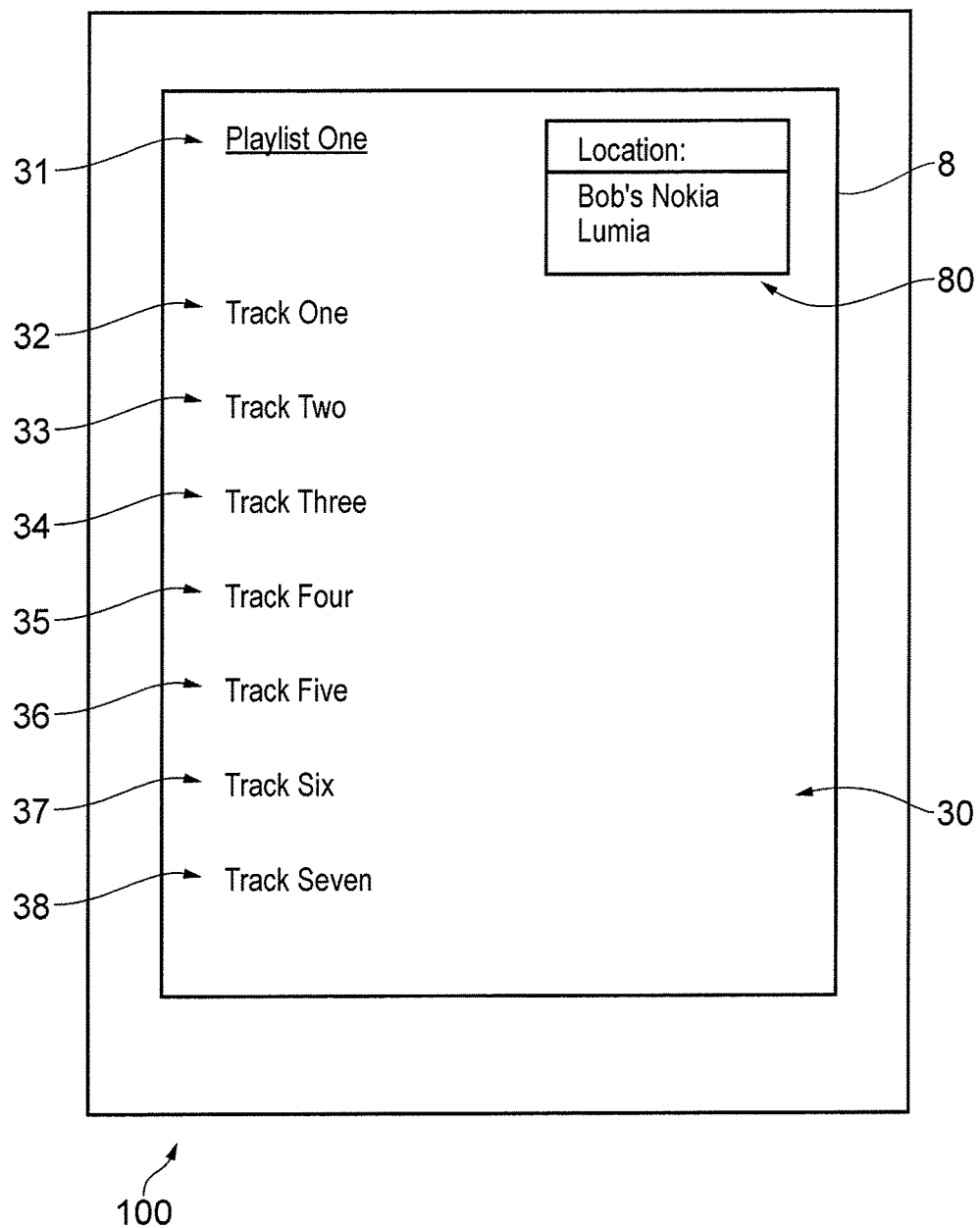
FIG. 10 illustrates the first apparatus illustrated in FIG. 6 after the fourth translation input has been received and responded to at the second apparatus.

In this example, the user of the third apparatus 300 is named Bob. Thus, FIG. 10 illustrates the display 8 of the first apparatus 100 displaying an indication 80 on the display 8 that the user interface 30 is currently located at (and displayed on) Bob's Nokia Lumia (the third apparatus 300). The identifier "Bob's Nokia Lumia" may be provided to the first apparatus 100 by the second apparatus 200 or the third apparatus 300.

The user interface 30 displayed at the third apparatus 300 enables the user of the third apparatus 300 to control the first apparatus 100, at least to some extent. For example, the user interface 30 may enable the user of the third apparatus 300 to control media content output by the first apparatus 100. The user of the third apparatus 300 might be able to control the media content that is currently being output (to the media output device 50) by the first apparatus 100 and/or control which media content will be output in the future by the first apparatus 100 (for example, by adding a media content, such as an audio track, to the playlist).

In some implementations it may be possible, for example, for the user of the third apparatus 300 to use the transferred user interface 30 to control some aspect of the third apparatus 300. For example, the user may be able to use the user interface 30 to insert media content, accessible by the third apparatus 300 (for example, stored in the memory 14 of the third apparatus 300 or streamable by the third apparatus 300 from a cloud service), into the playlist. At the appropriate point in time (for example, when a track stored in the memory 14 of the third apparatus 300 or streamable from a cloud service is due to be played), the third apparatus 300 may stream media content to the media output device 50, either directly or via the first apparatus 100, to enable that media content to be consumed by the users of the first, second and third apparatuses 100, 200, 300 via the media output device 50.

In this example, the user of the first apparatus 100 decides that he does not want the user of the third apparatus 300 to add anything (more) to the playlist. Consequently, he decides to take the user interface 30 back from the user of the third apparatus 300.

At block 1206 in FIG. 12, the user of the first apparatus 100 provides user input at the first apparatus 100 which causes the user interface 30 to return from the third apparatus 300 to the first apparatus 100. It may be that the user of the first apparatus 100 has "overall control" of the user interface 30 and can cause it to return to the apparatus 100 at any time. For example, in such circumstances, the user could have provided user input, while the user interface 30 was located at the second apparatus 200, which would have caused the user interface 30 to return from the second apparatus 200 to the first apparatus 100.

Figure 11:
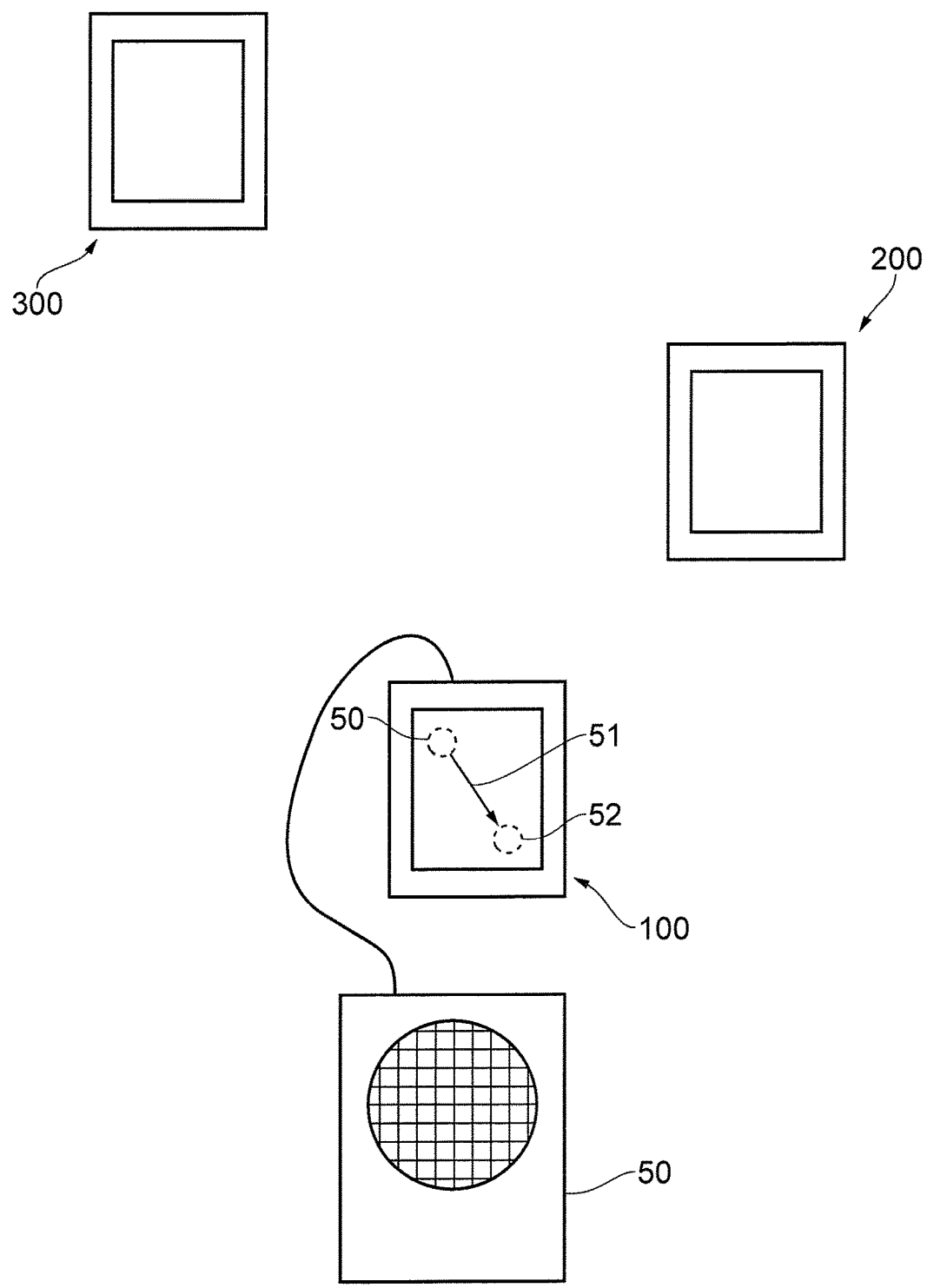
FIG. 11 illustrates a fifth translation input being provided at the first apparatus illustrated in FIG. 6.

An example of the user input that the user of the first apparatus 100 may provide in order to cause the user interface 30 to return to the first apparatus 100 is illustrated in FIG. 11.

In the illustrated example, the user input is a gesture input in the form of a translation input at the display 8. The translation input illustrated in FIG. 11 is directed away from the third apparatus 300 so, advantageously, the user of the first apparatus 100 feels as if he is pulling the user interface 30 back from the third apparatus 300.

A method of sharing a user interface has been described above in which media content that is output by a first apparatus 100 may be controlled by users of second and third apparatuses 200, 300. Advantageously, in embodiments of the invention, the first apparatus 100 enables the user to determine where the user interface 30 is currently located and enables him to "pull back" the user interface 30 when he wishes, allowing him to maintain overall control of the user interface 30.

References to 'computer-readable storage medium', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 12 may represent steps in a method and/or sections of code in one or more computer programs 18. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the gesture input that is provided to cause the user interface to be transferred from one apparatus to another need not be a translation input at a display 8. For example, it could instead be a "throwing action" which is performed while an apparatus is held in the hand (and detected by one or more accelerometers in that apparatus).

In some implementations, the "translation input" that is described above need not be provided by moving an object across a display while it is in contact with the display. It could, for example, be a hovering translation input, in which the object is moved across the apparatus 20 (such as across the display of the apparatus 20), while the object is displaced from (and not in contact with) the apparatus 20.

In some embodiments of the invention, the media content output device 50 may not be present and instead the media content may be output by a loudspeaker of the first apparatus 100 as audible signals.

In some implementations, the user interface 30 could consist of a single screen 31, rather than multiple screens 31, 71. In some circumstances, the user interface 30 may be shared between more or fewer than three apparatuses 100, 200, 300.

In some embodiments, the processor 12 of the first apparatus 100 may be configured to determine which apparatuses 200, 300 the user interface 30 has passed through. The processor 12 of the first apparatus 100 may, for example, be configured to control the display 8 of the first apparatus 100 to display a map interface indicating all of the apparatuses 200, 300 that the user interface 30 has travelled to.

An example of a method is described above in which the user of the second apparatus 200 provides a gesture input which causes the second apparatus 200 to transfer the user interface 30 to the third apparatus 300. Alternatively or additionally, it may be possible for the user of the first apparatus 100 to cause the second apparatus 200 to transfer the user interface 30 from the second apparatus 200 to the third apparatus 300. This is useful because it enables the user of the first apparatus 100 to move the user interface 30 on if, for example, he thinks that the (user of the) second apparatus 200 is keeping hold of the user interface 30 for too long.

In some implementations, it is not necessary for the apparatuses 100, 200, 300 to be local to one another in order for the apparatuses 100, 200, 300 to share the user interface 30 between them. The apparatuses 100, 200, 300 could, for instance, continue sharing the user interface 30 even if one of the users moves his apparatus 100, 200, 300 so that it is no longer proximate to the other apparatuses 100, 200, 300. Alternatively, the apparatuses 100, 200, 300 might never be proximate to one another when user interface sharing takes place. For example, the one or more receivers 3 and the one or more transmitters 4 could include a cellular receiver and a cellular transmitter which could be used to share the user interface 30. The display(s) 8 of some or all of the apparatuses 100, 200, 300 may, for example, display a map view which indicates the position of the other apparatuses 100, 200, 300 on it. The map view might only be displayed at an apparatus if there is at least one other apparatus which is determined to be more than a threshold distance away from it. In some examples, when the map view is displayed, a user provide a translation input that is directed towards an indication of the position of another apparatus on the map view, in order to cause the user interface 30 to be transferred to that apparatus.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

I claim:

1. An apparatus comprising:
 at least one processor; and
 at least one memory storing computer program code configured, working with the at least one processor, to cause the apparatus at least to perform:
 controlling a touch-sensitive display to display a user interface comprising a plurality of user selectable items corresponding with a plurality of media content items accessible by the apparatus;
 determining, in response to a first translation gesture input being provided by a user of the apparatus engaging the touch-sensitive display, whether the first translation gesture has a direction of travel corresponding to a direction associated with a further apparatus, wherein the determining is based at least in part on the direction of the first translation gesture input, a position of the apparatus, an orientation of the apparatus, and a position of the further apparatus;
 in an instance in which it is determined that the direction of travel of the translation gesture input by the user corresponds with the direction associated with the further apparatus:
 deciding to transfer control of the user interface to the further apparatus;
 controlling a radio frequency transmitter to transfer control of the user interface, comprising the plurality of user selectable items corresponding with the plurality of media content items accessible by the apparatus, to the further apparatus without transferring the plurality of media content items to the further apparatus, wherein display of the plurality of user selectable items of the user interface at the further apparatus enables a further user of the further apparatus to control the apparatus to access the plurality of media content items and cause at least aural output of the plurality of media content items; and
 responding, by the apparatus, to input provided by the further user at the further apparatus, by accessing a media content item from the plurality of media content items and causing, by the apparatus, at least aural output of the accessed media content item via an output device forming part of the apparatus or via an external media output device that is different from the apparatus and the further apparatus;
 determining, after transferring control of the user interface to the further apparatus, in response to a second translation gesture input being provided by the user of the apparatus engaging the touch-sensitive display, whether the second translation gesture has a direction of travel corresponding to a line between the further apparatus and the apparatus; and
 in an instance in which it is determined that the direction of travel of the second translation gesture input by the user has the direction of travel corresponding to the line between the further apparatus and the apparatus, causing control of the user interface, comprising the plurality of user selectable items corresponding with the plurality of content items accessible by the apparatus, to return to the apparatus from the further apparatus.

2. The apparatus as claimed in claim 1, wherein the computer program code is configured, working with the at least one processor, to cause the apparatus to further perform: deciding to transfer control of the user interface to the further apparatus, rather than a different apparatus, after determining that the translation gesture input is directed towards the further apparatus.

3. The apparatus as claimed in claim 1, wherein the computer program code is configured, working with the at least one processor, to cause the apparatus to perform: controlling the display to display an indication of the current location of control of the user interface which indicates that the control of the user interface is currently located at the further apparatus.

4. The apparatus as claimed in claim 3, wherein the computer program code is configured, working with the at least one processor, to cause the apparatus to perform: updating the indication displayed by the display, following transfer of the control of the user interface to another apparatus by the further apparatus, in order to indicate that control of the user interface is currently located at the another apparatus.

5. The apparatus as claimed in claim 1, wherein at least some of the media content items that are accessible by the apparatus are stored locally in the at least one memory of the apparatus.

6. The apparatus as claimed in claim 1, wherein at least some of the media content items that are accessible by the apparatus are stored remotely from the apparatus and the further apparatus as part of a cloud service.

7. The apparatus as claimed in claim 1, wherein the apparatus further comprises at least one touch-sensitive display and an external housing that houses the at least one processor, the at least one memory and the at least one touch-sensitive display, and wherein the further apparatus comprises at least one further touch-sensitive display and a further external housing that houses the at least one further touch-sensitive display.

8. The apparatus as claimed in claim 1, wherein causing at least aural output of the accessed media content item comprises causing output of the accessed media content item via an output device forming part of the apparatus or via an external media output device that is different from the apparatus and the further apparatus, without the accessed media content item being output aurally by the further apparatus.

9. The apparatus as claimed in claim 1, wherein control of the user interface is returned from the further apparatus following an addition of a user selectable item corresponding with a media content item to the user interface made at the further apparatus, and the computer program code is configured, working with the at least one processor, to: cause display of the user interface including the addition made at the further apparatus.

10. The apparatus of claim 1, wherein the apparatus is a hand-portable electronic device and the further apparatus is a further hand-portable electronic device.

11. A method, comprising:
controlling a touch-sensitive display of an apparatus to display a user interface comprising a plurality of user selectable items corresponding with a plurality of media content items accessible by the apparatus;
determining, in response to a first translation gesture input being provided by a user of the apparatus engaging the touch-sensitive display, whether the first translation gesture has a direction of travel corresponding to a direction associated with a further apparatus, wherein the determining is based at least in part on the direction of the first translation gesture input, a position of the apparatus, an orientation of the apparatus, and a position of the further apparatus
in an instance in which it is determined that the direction of travel of the translation gesture input by the user corresponds with the direction associated with the further apparatus:
deciding to transfer control of the user interface to the further apparatus;
controlling a radio frequency transmitter of the apparatus to transfer control of the user interface, comprising the plurality of user selectable items corresponding with the plurality of media content items accessible by the apparatus, to the further apparatus without transferring the plurality of media content items to the further apparatus, wherein display of the plurality of user selectable items of the user interface at the further apparatus enables a further user of the further apparatus to control the apparatus to access the plurality of content items and cause at least aural output of the plurality of media content items; and
responding, by the apparatus, to input provided by the further user at the further apparatus by accessing a media content item from the plurality of media content items and causing, by the apparatus, at least aural output of the accessed media content item via an output device forming part of the apparatus or via an external media output device that is different from the apparatus and the further apparatus;
determining, after transferring control of the user interface to the further apparatus, in response to a second translation gesture input being provided by the user of the apparatus engaging the touch-sensitive display, whether the second translation gesture has a direction of travel corresponding to a line between the further apparatus and the apparatus; and
in an instance in which it is determined that the direction of travel of the second translation gesture input by the user has the direction of travel corresponding to the line between the further apparatus and the apparatus, causing control of the user interface, comprising the plurality of user selectable items corresponding with the plurality of content items accessible by the apparatus, to return to the apparatus from the further apparatus.

12. The method as claimed in claim 11, wherein the accessed media content item is at least aurally output via an output device forming part of the apparatus.

13. The method as claimed in claim 11, wherein the accessed media content item is at least aurally output via an external media output device that is different from the apparatus and the further apparatus.

14. A non-transitory computer readable medium storing computer program code configured, working with at least one processor, to cause at least the method as claimed in claim 11 to be performed.

15. The method as claimed in claim 11, wherein the playlist is returned from the further apparatus following an addition of a user selectable item corresponding with a media content item to the playlist made at the further apparatus, and the method further comprises: causing display of the user interface including the addition made at the further apparatus.

16. The method of claim 11, wherein the apparatus is a hand-portable electronic device and the further apparatus is a further hand-portable electronic device.

17. The method of claim 11, wherein, in an instance in which the further apparatus has transferred the user interface and control of the user interface to a different apparatus, the second translation gesture input by the user of the apparatus engaging the touch-sensitive display is operable to cause the user interface and control of the user interface to return to the apparatus.

18. A hand-portable electronic device, comprising:
at least one touch-sensitive display;
at least one radio frequency transceiver;
at least one processor; and
at least one memory storing computer program code configured, working with the at least one processor, to cause at least the following to be performed:
controlling the at least one touch-sensitive display to display a playlist comprising a plurality of user selectable items corresponding with a plurality of media content items playable by the hand-portable electronic device;
determining, in response to a first translation gesture input being provided by a user of the hand-portable electronic device engaging the touch-sensitive display, whether the first translation gesture has a direction of travel corresponding to a direction associated with a further hand-portable electronic device, wherein the determination is based at least in part on the direction of the first translation gesture input, a position of the hand-portable electronic device, an orientation of the hand-portable electronic device, and a position of the further hand-portable electronic device;

in an instance in which it is determined that the direction of travel of the translation gesture input by the user corresponds with the direction associated with the further hand-portable electronic device:

deciding to transfer control of the user interface to the further hand-portable electronic device;

controlling the at least one radio frequency transceiver to transfer control of the playlist to the further hand-portable electronic device without transferring the plurality of media content items to the hand-portable electronic device, wherein the display of the playlist at the further hand-portable electronic device enables a further user of the further hand-portable electronic device to control the hand-portable electronic device to playback the plurality of media content items at the hand-portable electronic device;

causing the at least one touch-sensitive display to continue displaying the playlist, after transferring control of the playlist to the further hand-portable electronic device, including displaying the playlist responding to navigation actions performed by the further user of the further hand-portable electronic device; and responding, by the hand-portable electronic device, to input provided by the further user at the further hand-portable electronic device by accessing a media content item from the plurality of media content items and causing, by the hand-portable electronic device, at least aural output of the accessed media content item via an output device forming part of the hand-portable electronic device or via an external media output device that is different from the hand-portable electronic device and the further hand-portable electronic device;

determining, after transferring control of the user interface to the further hand-portable electronic device, in response to a second translation gesture input being provided by the user of the hand-portable electronic device engaging the at least one touch-sensitive display, whether the second translation gesture has a direction of travel corresponding to a line between the further hand-portable electronic device and the hand-portable electronic device;

in an instance in which it is determined that the direction of travel of the second translation gesture input by the user has the direction of travel corresponding to the line between the further hand-portable electronic device and the hand-portable electronic device, causing the control of the playlist, comprising the plurality of user selectable items corresponding with a plurality of media content items playable by the hand-portable electronic device, to return to the hand-portable electronic device, from the further hand-portable electronic device via the radio frequency transceiver, following an addition of a user selectable item corresponding with a media content item to the playlist made at the further hand-portable electronic device; and controlling, after return of control of the playlist to the hand-portable electronic device, the at least one touch-sensitive display to display the playlist including the addition made at the further hand-portable electronic device.

19. The hand-portable electronic device as claimed in claim 18, wherein the computer program code is configured, working with the at least one processor, to: distinguish between the translation gesture input provided by the user to transfer the playlist to the further hand-portable electronic device, and a navigational gesture input for navigating the user interface at the hand-portable electronic device.

* * * * *